Jan. 23, 1962 S. H. BINGHAM 3,017,838
SYMMETRIC TRUCK FOR OVER-RUNNING MONORAIL CARS
Filed Feb. 26, 1960 7 Sheets-Sheet 2

INVENTOR.
SIDNEY H. BINGHAM
BY
Darby & Darby
ATTORNEYS

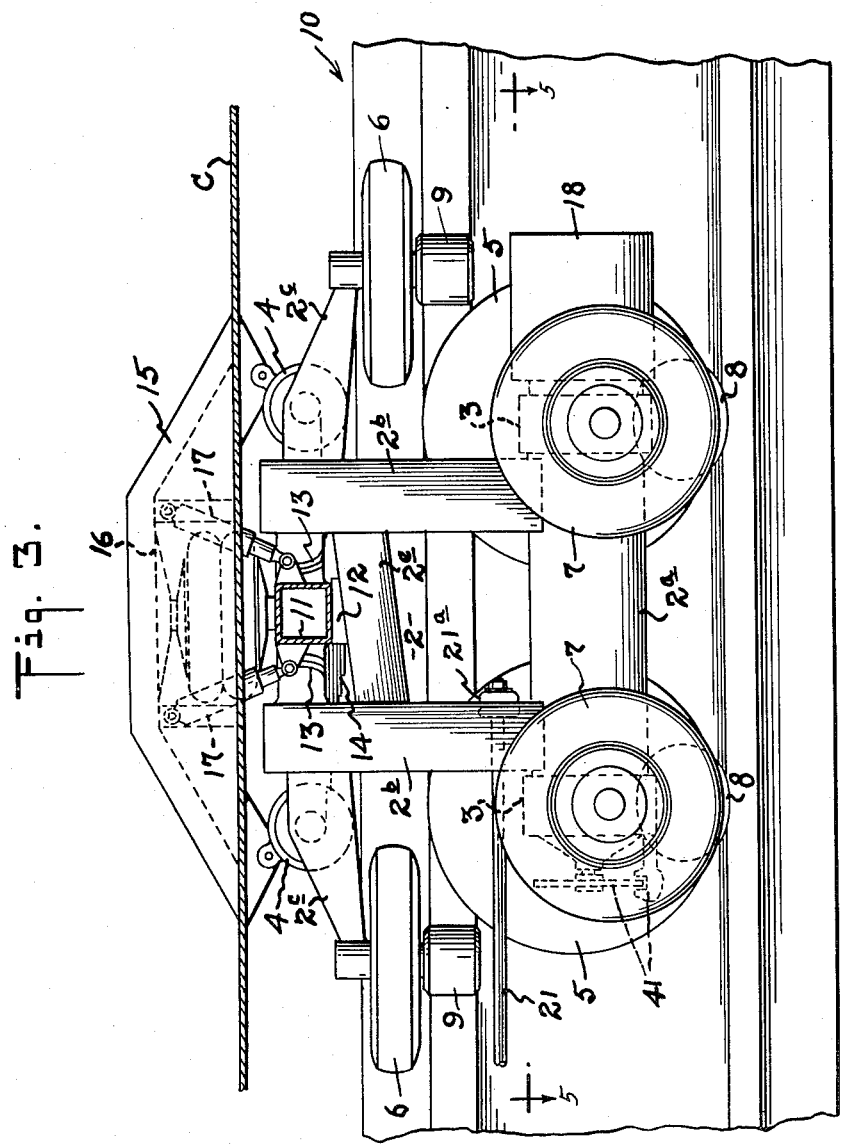

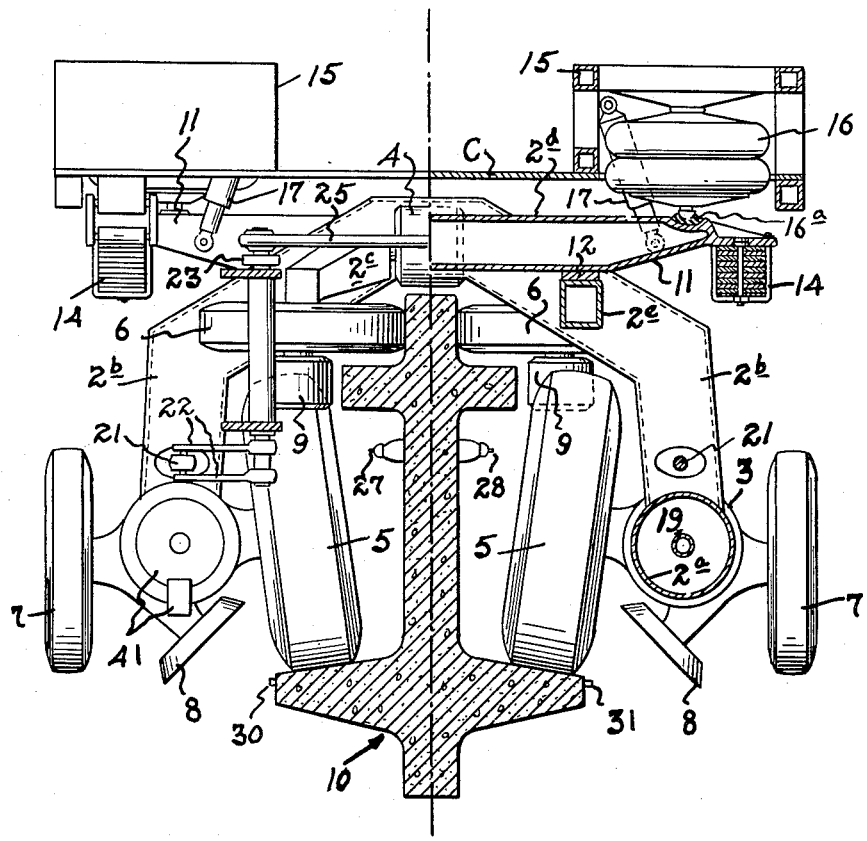

Jan. 23, 1962 S. H. BINGHAM 3,017,838
SYMMETRIC TRUCK FOR OVER-RUNNING MONORAIL CARS
Filed Feb. 26, 1960 7 Sheets-Sheet 5
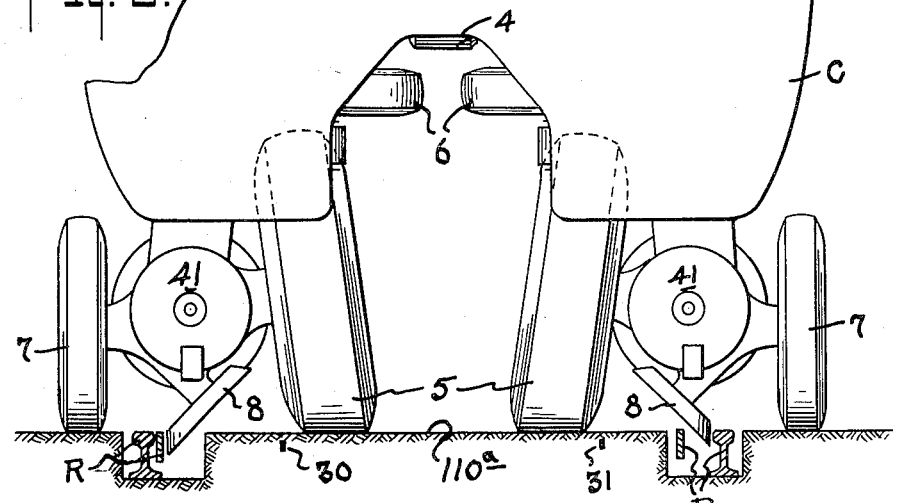
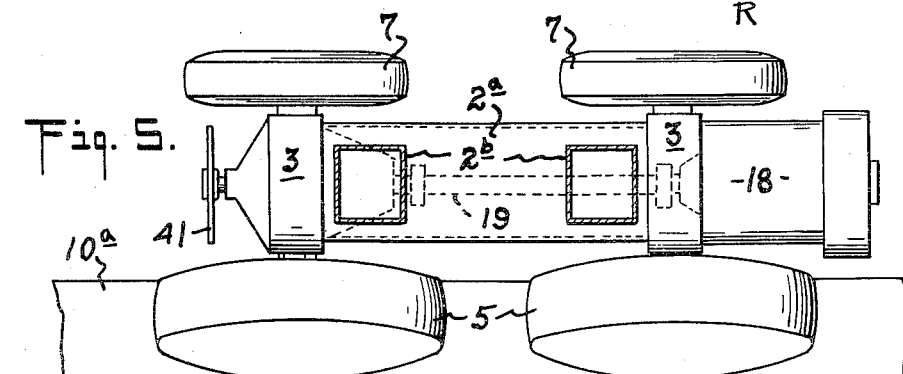
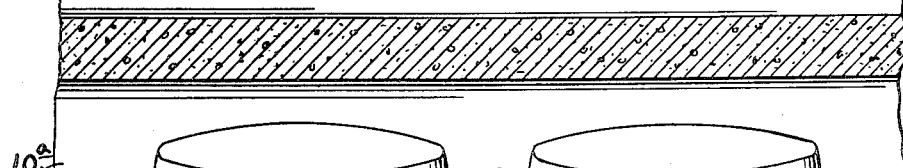
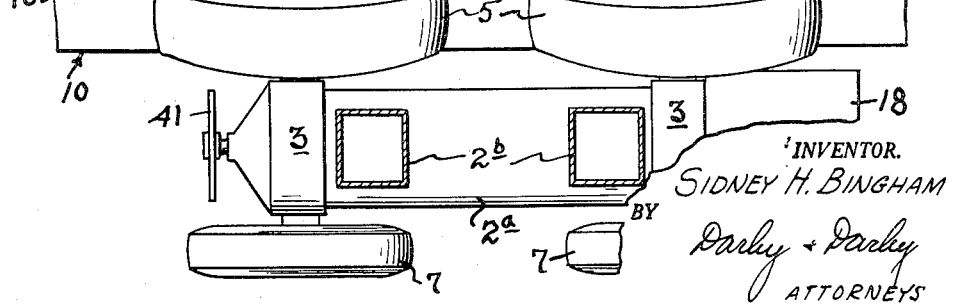
INVENTOR.
SIDNEY H. BINGHAM
BY Darby & Darby
ATTORNEYS Jan. 23, 1962 S. H. BINGHAM 3,017,838
SYMMETRIC TRUCK FOR OVER-RUNNING MONORAIL CARS
Filed Feb. 26, 1960 7 Sheets-Sheet 6

INVENTOR.
SIDNEY H. BINGHAM
BY
Darby & Darby
ATTORNEYS

United States Patent Office 3,017,838
Patented Jan. 23, 1962

3,017,838
SYMMETRIC TRUCK FOR OVER-RUNNING
MONORAIL CARS
Sidney H. Bingham, 109 E. 35th St., New York, N.Y.
Filed Feb. 26, 1960, Ser. No. 11,307
10 Claims. (Cl. 104—120)

This invention relates to improvements in monorail transportation systems.

Broadly speaking, the invention herein disclosed incorporates a coordination of the beam contour and the truck arrangement which permits:

(a) A conventional car floor and seating arrangement.

(b) The elimination of the necessity for moving or bending the beam during switching.

(c) The elimination of the necessity for twisting the beam in order to obtain super-elevation on curves.

(d) Car stability on the narrow track beam is assured because the center of gravity has been placed close to the guiding level and also because the running wheels have a slanted setting.

An important object of this invention involves a novel form of monorail car truck especially designed for cooperation with a particular form of beam contour as a result of which the car construction supported thereon provides a clear unobstructed space which does not interfere with any desired seating arrangements.

Still another object of the invention is the association of these parts whereby the center of gravity of the car and truck assembly is placed close to the guiding level provided by the beam.

Another important object of this invention is the provision of a track assembly having means for facilitating the switching of cars or trucks employing such tracks at the switching points in the monorail system.

Another important object of the invention is to provide a track assembly for monorail cars and trucks having provision for transferring the cars and trucks directly from a monorail system to standard gauge two rail systems.

Many other objects of the invention will be explained below in connection with the structural features by means of which they are attained.

This application is a continuation in part of my co-pending applications Serial No. 826,754, filed July 13, 1959, now abandoned, and Serial No. 836,792, filed August 28, 1959, also abandoned, each entitled Symmetric Truck for Over-Running Monorail Cars.

There is illustrated in the accompanying drawings, one embodiment of the subject matter of this invention.

In those drawings,

FIGURE 3 is a side elevational view of the beam and car truck showing the bolster in cross-section and a small part of the car floor in cross-section and the housing for the load equalizing means in elevation;

FIGURE 4 is a cross-sectional view taken on the line 4—4 of FIG. 2, whereby the lefthand side of the drum is in elevation and the righthand in vertical cross-section;

FIGURE 5 is a cross-sectional view taken on the line 5—5 of FIG. 3;

FIGURE 6 is an end elevational view of the truck and car body assembly, the upper part of the car broken away and the beam in cross-section at the switching point;

Figure 7:
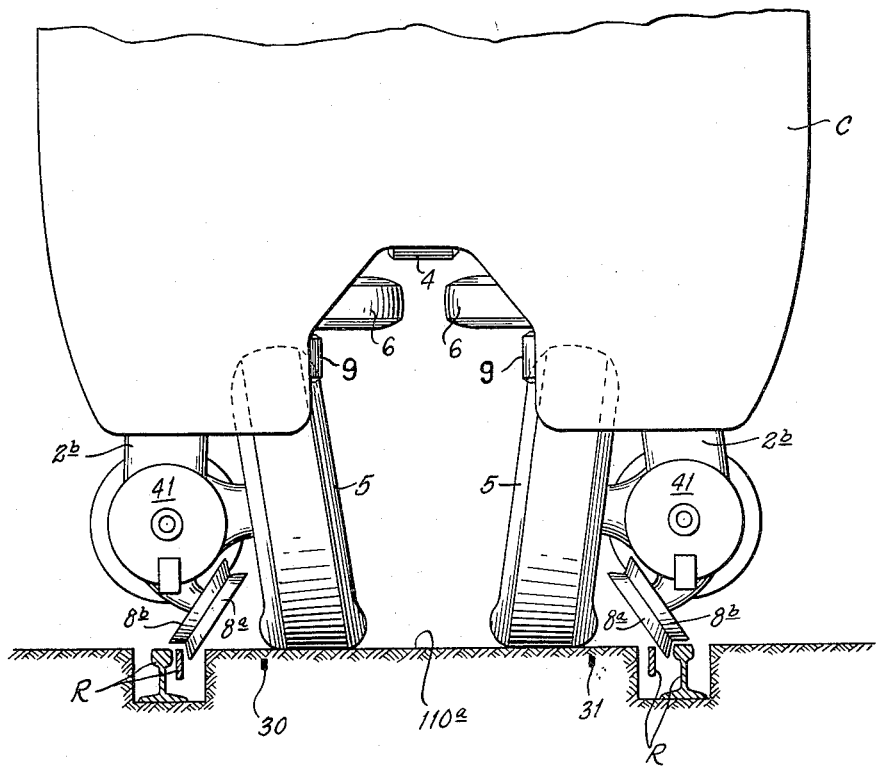
Figure 8:
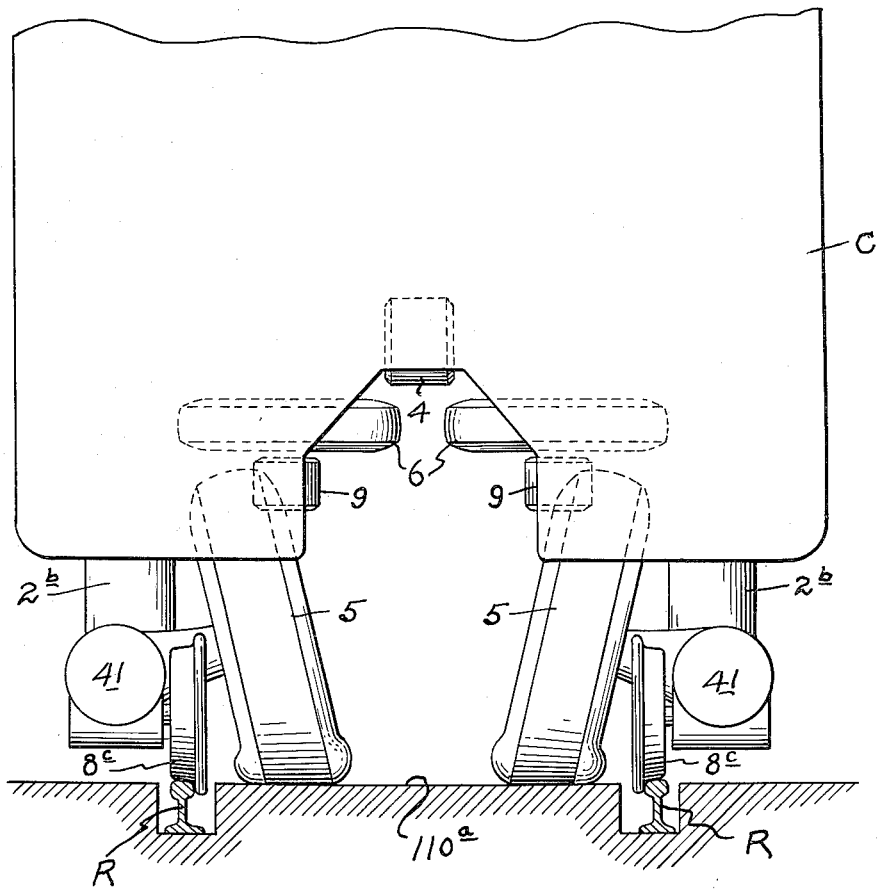

FIGURE 7 is an end elevational view of a truck and car body assembly similar to that of FIG. 6, in which, however, combined switching and stabilizing wheels are provided so that the car can be controlled at switching points in the monorail system or transferred to standard gauge two track rail systems; and FIGURE 8 is an end elevational view similar to that of FIGURE 7, differing however in the form of switching and stabilizing wheels employed.

The beam 10 which comprises the single rail of a monorail system can be stated to be in cross-section generally like an I beam. As clearly shown in FIG. 1, the beam has two pairs of vertically spaced flanges projecting from opposite sides of the web of the beam. The lower pair of flanges $10^a$ are wider than the upper pair of flanges $10^b$. The upper faces of the flanges $10^a$ are inclined downwardly from the vertical central axis of the beam, which feature will be referred to later. The web of the beam extends above the upper flange pair $10^b$ to provide guiding surfaces which are parallel to the edge faces of the flanges $10^b$ which also provide guiding surfaces. This beam will be supported above the ground in any suitable manner and, as will be explained later, by reason of the truck construction need not be twisted in order to obtain the super-elevation on the curves. Also, as will be explained later, the lower or riding flanges $10^a$ are provided with a modified section at the switching points where the portion of the beam thereabove is interrupted.

This beam can be fabricated of steel or of prestressed concrete. The running surfaces of the beam for the running wheels are, as shown, near the bottom of the beam. Because of this feature it is possible to provide the car with a floor which has a conventional relationship to the usual truck assembly for vehicles. In other words, it is not necessary to provide any accommodation for the drive wheels within the car body.

The truck frame comprises a pair of large diameter thin walled tubes $2^a$ which extend parallel to the beam on opposite sides thereof. At the ends of these tubes are the gear and bearing housings 3 for the running wheels 5, of which there are four, providing fore and aft pairs. An important feature of this invention resides in the fact that the running wheels are journaled for rotation in planes which converge to a line below the beam. This causes these wheels to be slanted outwardly so that they may ride on the outwardly inclined upper surface of the flanges $10^a$, as clearly illustrated in FIG. 1. At the same time the running wheels clear the upper pair of flanges $10^b$ and provide space for power circuit conductors 27 and 28 mounted on opposite faces of the central section of the beam. At this point it may also be noted that the end faces of the flanges $10^a$ provide suitable supports for signalling and the train control conductors 30 and 31. Suitable circuit making contact assemblies, not shown, can readily be mounted on the car truck for cooperation with the conductors 27, 28, 30 and 31.

The balancing wheels 7, one associated with each of the running wheels 5, are provided for a purpose to be described later.

Figure 2:
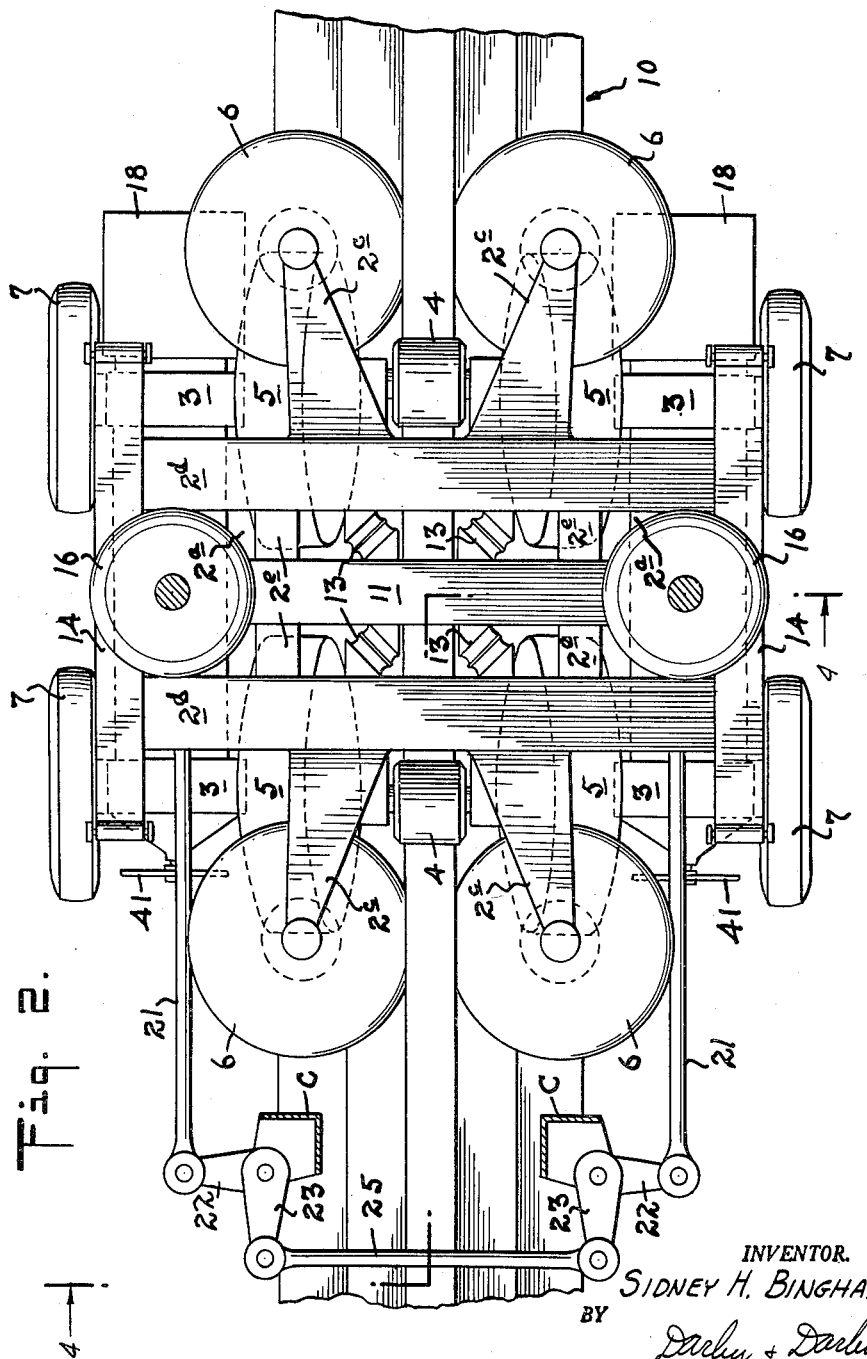
FIGURE 2 is a top plan view of the beam and car truck with a few parts in cross-section.

Structurally connected to the frame tubes $2^a$ and extending upwardly therefrom in spaced relation are a pair of truck structural members $2^b$ which are cross-connected in pairs over the top of the beam by means of the structural members $2^d$, see particularly FIG. 2. The side pairs of structural members $2^b$ are also interconnected by longitudinally extending structural members $2^e$ which lie in an inclined plane as is clear from FIG. 3.

Figure 1:
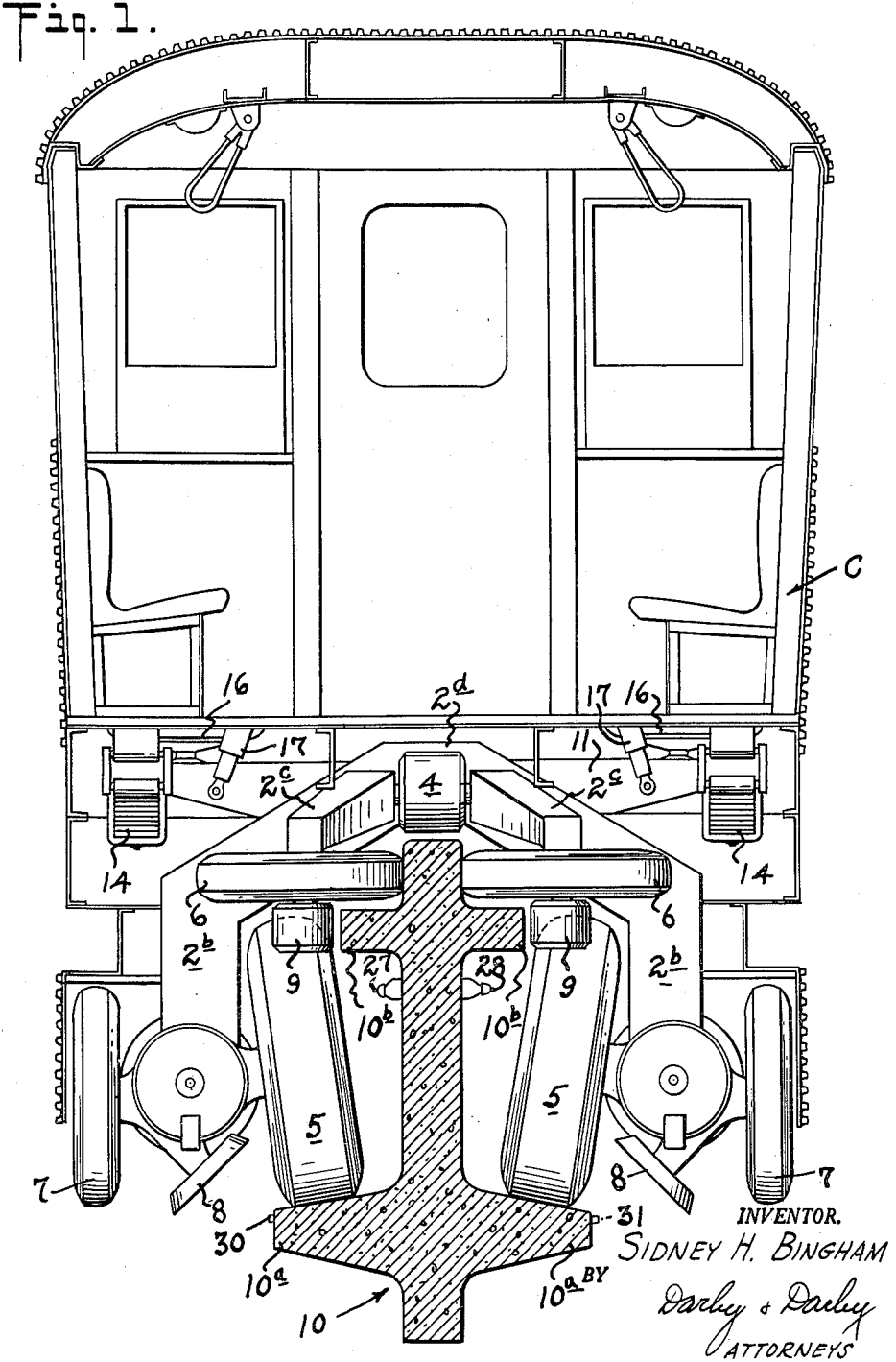
FIGURE 1 is an end elevational view of the car truck showing the car and beam in cross-section.

Extending fore and aft on opposite sides of the beam from the structural members $2^d$ are the cantilever arms $2^c$ on the ends of which are rotatably mounted guide wheels 6. These guide wheels, as is clear from FIG. 2, provide fore and aft pairs which, as shown in FIG. 1, ride on opposite sides of the upper terminal end of the central section of the beam. At this point it is noted that the running wheels 5 and the guide wheels 6 are preferably provided with pneumatic tires. In the event that one or more of the running wheel tires become deflated, skid wheels 4 are provided on the truck frame in a position to ride on top of the beam as is clear from FIG. 1. In the event that one or more of the tires of the guide wheel 6 become deflated, skid wheels 9, journaled on the same axes, are provided to engage the end faces of the upper pair of flanges 10b. As is clear from FIG. 1, when the tires 5 and 6 are fully inflated, skid wheels 4 and 9 do not engage the beam.

Mounted on the ends of the tubes 2a are the drive motors 18 for the truck, which are shown diagrammatically because they may be of the electric, turbine, or gas engine type. Extending through the tubes, as shown in FIG. 4, are the drive shafts 19 which connect the motors 18 with the running wheels 5 through the gear boxes 3. In passing, it is noted that the inclined guide wheels 8, associated with the pairs of running wheels 5 and stabilizing wheels 7, are used in the switching operation, which will be described later.

An important feature of this invention which is also used in another form of monorail car truck involves the mounting of the bolster 11. The other form referred to is disclosed in my copending application Serial No. 811,878, filed May 8, 1959, now Patent No. 3,002,467. As shown herein the bolster 11 extends transversely of the car truck over the top of the beam and is supported at its ends on the inclined structural members 2e, see FIG. 3. Interposed between the ends of the bolster beam 11 and these structural members are wedge-shaped blocks 12 which may slide on the structural members 2e. In other words, these blocks are secured to the ends of the beam and are preferably made of some self-lubricating material such as "Teflon." It goes without saying that the upper surface of the inclined structural members 2e are prepared to facilitate this sliding movement under load.

The structural members 2e, being sloped downwardly toward one end of the car and upwardly toward the center of the car (there being two trucks for each car), facilitate negotiation of the curves. Thus, when the car is negotiating a curve, the side of the bolster 11, which extends toward the center of the curve, is lowered while the other side of the bolster is raised. This causes the car to bank toward the center of the curve and, in fact, is a substitute for the super-elevation of the rails which is normally used in railway practice. As is well known in the usual rail system, the outside rail on a curve is raised in relation to the inside rail to bank the car. With the bolster construction herein disclosed the car is banked without requiring that the beam be twisted to effect banking. Twisting of the beam, needless to say, is a costly and difficult operation rendered unnecessary by this novel feature.

As shown in FIG. 2, the bolster is normally centered with respect to the car frame by four shock absorbing elements 13 arranged in pairs fore and aft and transversely of the truck. These cushioning members act in unison to provide the equivalent of a flexible ball joint.

Secured to the ends of the bolster 11 at their centers are a pair of conventional steel suspension leaf springs 14 which in turn are respectively connected at their ends to the underframe of the car C. Also interposed between the car body and the ends of the bolster 11 are the pairs of hydraulic shock absorbers 17 which provide for suitable suspension dampening.

Leveling air suspension springs 16 are also located between the ends of the bolster 11 and the car body frame 15 to compensate for the passenger load variations through the functioning of deflection control valves not shown. The lower ends of the suspension springs are secured to the ends of the bolster 11 as at 16a, see FIG. 4. These air suspension spring systems are well known in the art and have therefore been shown only generally. They provide, in a well known manner when used as disclosed herein, constant clearance between the car floor and the top of the beam, for example, regardless of variations in the loading of the car.

Traction and braking forces are transmitted from the truck to the car frame solely by means of two drag rods 21. These drag rods, which lie on opposite sides of the beam, are connected to the truck at one end by any suitable form of fixture such as shown at 21a in FIG. 3. Their other ends are respectively connected to the bell crank levers 22—23 journaled on a vertical axis on adjacent portions of the car body frame, see FIGS. 2 and 4. Specifically the drag rods 21 are connected to the crank arms 22. The crank arms 23 are interconnected by a transversely extending connecting rod 25. As will be apparent to those skilled in the art, this linkage system provides orientational freedom between the truck and car when traversing curves as well as absorbing the usual traction and braking forces generated in normal operation.

At switching points, as illustrated in FIG. 6, the lower flanges 10a of the beam 10 are greatly enlarged to provide a section 110a. As illustrated at this point, all the portion of the beam above these flanges is eliminated. Mounted in recesses in the riding surface 110a are conventional rails and switches R. At this time the switching wheels 8 engage the rails R in a manner similar to the flange of the conventional railway car wheel. The result is that the car and truck follows the rail and the switch position in a conventional manner. At this time the running wheels 5 rest on the upper surface of the flange 110a and the car and truck are given lateral stability by the stabilizing wheels 7 which also ride on the flange. The balancing wheels 7 are required at this time since the guiding level of the car in relation to its center of gravity has been lowered temporarily. Although of no important significance here, the elements 41 are parts of a dynamic braking system which would most likely be used in combination with the mechanical braking when the drive motors 18 are electric motors.

In the arrangement of FIG. 7, it will be seen by comparison with FIG. 6 that the outboard stabilizing wheels 7, one of which is associated with each of the running wheels 8, have been eliminated. Furthermore, the switching wheels 8 have been modified so that they can perform the function of switching and the additional function of stabilizing the truck laterally. For this purpose stabilizing wheels are each provided with two flanges 8a and 8b. The flange 8a performs the same function as the switching wheels 8 for the structure of FIG. 6, cooperating with the sides of the rails, as in the previous case. The flanges 8b are arranged as shown in FIG. 7 to engage the rail heads and thereby perform the function of imparting lateral stability to the truck as a substitute for the outboard stabilizing wheels 7 of the arrangement of FIG. 6. Thus, in the assembly of FIG. 7, the wheels 8a and 8b perform both switching and stabilizing functions.

While suggested above that the switching wheels 8 of FIG. 6 and the switching and stabilizing wheels 8a and 8b of FIG. 7 can be used at modified sections of the monorail 10 to effect switching and/or stabilizing, it will be apparent to those skilled in the art that these trucks, and particularly the truck of FIG. 7 can be interchanged without modification for operation either on a monorail beam or on a standard gauge two rail railway system. The arrangement of FIG. 6 is not so readily adapted for transfer from moonrail to a standard railway system unless the rails of the standard system are set in a roadbed like that illustrated at 110a in FIG. 6. In the case of the arrangement of FIG. 7, however, the truck will operate on a two rail system without the need for providing the side extensions of the roadbed 10a lying outside of the rails R. This is true, as is apparent from FIG. 7 because there is no longer any need for the surface to be engaged by the stabilizing wheels 7. It will be necessary, however, as shown in FIG. 7, to raise the ground level between the rails R so as to provide running surfaces for the running wheels 5.

As a further modified practical construction there is illustrated in FIG. 8 a form of stabilizing and switching wheel which is the usual flanged railway wheel. Since most of the elements in FIG. 8 are substantially the same as those in FIG. 7, no further reference thereto is necessary. However, it will be noted that the stabilizing and switching wheels corresponding to the wheels 8 in FIG. 6, for example, and the wheels 8ᵃ and 8ᵇ in FIG. 7 have been changed to a flanged type of railway wheel 8ᶜ. An important advantage of this arrangement is that monorail equipment in accordance with this invention by the provision of such standard flanged wheels can move interchangeably over a single monorail or a standard gauge track railway. This greatly increases the applicability of the invention herein disclosed in a practical sense.

For emphasis it is noted that an important and correlated feature of this invention involves the slanting of the running wheels 5 with a particular beam configuration, this combination greatly aiding car stability on a narrow track beam such as illustrated. In addition, this arrangement provides a suitable space for the conductors 27 and 28 and the required contact shoes, not shown, for transferring the power to the truck circuits.

Since the disclosure describes in detail but one modification of the novel subject matter herein disclosed, it is desired that the disclosure be taken in an explanatory sense and that the scope of protection afforded hereby be determined by the appended claims.

What is claimed is:

1. A symmetrical over-running monorail car system comprising in combination a track beam having a vertically positioned web and pairs of vertically spaced horizontal flanges projecting from opposite sides of said web, said web extending above said upper pair of flanges, a truck frame shaped to straddle said beam from above, pairs of fore and aft running wheels journaled on said truck frame and riding on the upper faces of the lower flanges, means on said truck frame for driving at least two of said wheels, guide wheels journaled on said truck frame and positioned to engage opposite faces of said web above the upper flanges and skid wheels journaled on said truck adjacent the edge faces of said upper pair of flanges and the top edge face of said web.

2. In the combination of claim 1 said driving wheels being journaled on downwardly diverging axes in pairs and the upper faces of the lower flanges converging upwardly.

3. In the combination of claim 1, stabilizing wheels journaled on said truck to provide lateral support therefor by engagement with supports provided at switching points where said beam is interrupted.

4. In the combination of claim 1, switching wheels journaled on said truck for switching guidance on switching rails provided at switching points where said beam is interrupted.

5. In the combination of claim 1, stabilizing and switching wheels journaled on said truck at said driving wheel positions to provide, respectively, lateral support by engagement with supports provided at switching points and switching guidance with rails provided at switching points where said beam is interrupted.

6. In the combination of claim 1, a car body, means for mounting said car on and above said truck frame, and means interconnecting the car body and truck frame at points spaced longitudinally of said beam for transmitting the traction and braking forces between the truck frame and the car body.

7. In the combination of claim 1, a bolster, means supporting the bolster for pivoting of said frame on a vertical axis, a car body mounted on said bolster, and a pair of longitudinally inclined parallel members on said truck frame on opposite sides of said beam interposed between the bolster and frame for causing car banking movements of said bolster at curves in said beam.

8. In the combination of claim 1, combined stabilizing and switching wheels mounted on said frame and associated with said running wheels in pairs for respective engagement with supporting surfaces and rails where said beam is interrupted.

9. A symmetrical over-running monorail car system comprising in combination a track beam of generally I-shape cross-section positioned with its web vertical and its flanges horizontal, a truck frame shaped to straddle said beam from above, pairs of fore and aft running wheels journaled on said truck frame and riding on the upper faces of the lower flanges, means on said truck frame for driving at least two of said wheels, guide wheels journaled on said truck frame and positioned to engage opposite faces of said web above the upper flanges, a car body, means for mounting said car on and above said truck frame, and means interconnecting the car body and truck frame for transmitting the traction and braking forces between the truck frame and the car body comprising drag rods and a linkage system interconnecting the drag rods to equalize the force transmitted thereby.

10. A symmetrical over-running monorail car system comprising in combination a track beam of generally I-shape cross-section positioned with its web vertical and its flanges horizontal, a truck frame shaped to straddle said beam from above, pairs of fore and aft running wheels journaled on said truck frame and riding on the upper faces of the lower flanges, means on said truck frame for driving at least two of said wheels, guide wheels journaled on said truck frame and positioned to engage opposite faces of said web above the upper flanges, a bolster, means for supporting the bolster of said frame for relative pivotal movement on a vertical axis, a car body mounted on said bolster, and means for causing car banking movements of said bolster comprising longitudinally inclined parallel support members mounted on said truck and sliding support members interposed between the ends of said bolster and said inclined members.

References Cited in the file of this patent
UNITED STATES PATENTS

| | | |
|---|---|---|
| 313,830 | Meigs | Mar. 10, 1885 |
| 936,825 | Smith | Oct. 12, 1909 |
| 1,015,140 | Cordero | Jan. 16, 1912 |
| 1,716,004 | Ridley | June 4, 1929 |
| 2,027,684 | Fageol | Jan. 14, 1936 |
| 2,174,997 | Ronk | Oct. 3, 1939 |
| 2,205,506 | Van Der Sluys | June 25, 1940 |
| 2,225,242 | Van Dorn et al. | Dec. 17, 1940 |
| 2,227,140 | Kjolseth | Dec. 31, 1940 |
| 2,623,475 | Fraser | Dec. 30, 1952 |
| 2,853,956 | Wenner-Gren et al. | Sept. 30, 1958 |